(12) United States Patent
Suzuki

(10) Patent No.: US 8,768,279 B2
(45) Date of Patent: Jul. 1, 2014

(54) CROSS-POLARIZATION INTERFERENCE COMPENSATION APPARATUS, CROSS-POLARIZATION INTERFERENCE COMPENSATION METHOD, AND PROGRAM

(75) Inventor: Yuuzou Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/640,716

(22) PCT Filed: Apr. 13, 2011

(86) PCT No.: PCT/JP2011/059161
§ 371 (c)(1),
(2), (4) Date: Nov. 5, 2012

(87) PCT Pub. No.: WO2011/129362
PCT Pub. Date: Oct. 20, 2011

(65) Prior Publication Data
US 2013/0065547 A1   Mar. 14, 2013

(30) Foreign Application Priority Data

Apr. 15, 2010 (JP) ................. P2010-093993

(51) Int. Cl.
*H04B 1/10* (2006.01)
(52) U.S. Cl.
USPC ............................ 455/296; 455/305; 375/349
(58) Field of Classification Search
USPC ........ 455/130, 230, 276.1, 278.1, 279.1, 295, 455/296, 303, 304, 305, 334; 375/346, 347, 375/349, 350
See application file for complete search history.

(56) References Cited

U.S. PATENT DOCUMENTS

| | | | |
|---|---|---|---|
| 5,694,079 A | | 12/1997 | Allpress et al. |
| 6,236,263 B1 * | | 5/2001 | Iwamatsu ..................... 455/295 |
| 6,731,704 B1 | | 5/2004 | Kiyanagi |
| 7,130,605 B2 * | | 10/2006 | Valtolina et al. .............. 455/303 |
| 2010/0136916 A1 * | | 6/2010 | Kawai .......................... 455/63.1 |

FOREIGN PATENT DOCUMENTS

| | | |
|---|---|---|
| JP | 05-260014 A | 10/1993 |
| JP | 09-270764 A | 10/1997 |
| JP | 10-075122 A | 3/1998 |
| JP | 11-017762 A | 1/1999 |
| JP | 2001-060904 A | 3/2001 |

OTHER PUBLICATIONS

International Search Report in PCT/JP2011/059161 dated May 24, 2011(English Translation Thereof).

* cited by examiner

*Primary Examiner* — Thanh Le
(74) *Attorney, Agent, or Firm* — McGinn IP Law Group, PLLC

(57) ABSTRACT

A first signal having a first polarization direction and a second signal having a second polarization direction crossing the first polarization direction are received. A phase of the second signal is controlled using a phase control signal. An interference compensation signal is generated by weighted combination on a time-series of a signal whose phase has been controlled. Weighting coefficients used for the weighted combination are set so that the interference compensation signal becomes a cross-polarization interference component of the first signal. A phase difference between the first signal and the second signal is estimated using the weighting coefficients. The phase control signal is generated using the estimated phase difference so that a phase of the first signal and the phase of the second signal become identical. The first signal is compensated for cross-polarization interference caused by the second signal using the interference compensation signal and the first signal.

20 Claims, 7 Drawing Sheets

FIG. 3

| ADDRESS | NUMBER OF STAGES IN SHIFT REGISTER | DELAY TIME | TAP COEFFICIENTS | | | | | | |
|---|---|---|---|---|---|---|---|---|---|
| | | | 332-0 | 332-1 | 332-2 | 332-3 | 332-4 | 332-5 | 332-6 |
| 0 | 0 | 0 | 1 | 0 | 0 | 0 | 0 | 0 | 0 |
| 1 | 1 | T | 0 | 1 | 0 | 0 | 0 | 0 | 0 |
| 2 | 2 | 2T | 0 | 0 | 1 | 0 | 0 | 0 | 0 |
| 3 | 3 | 3T | 0 | 0 | 0 | 1 | 0 | 0 | 0 |
| 4 | 4 | 4T | 0 | 0 | 0 | 0 | 1 | 0 | 0 |
| 5 | 5 | 5T | 0 | 0 | 0 | 0 | 0 | 1 | 0 |
| 6 | 6 | 6T | 0 | 0 | 0 | 0 | 0 | 0 | 1 |

FIG. 7

| ADDRESS | NUMBER OF STAGES IN SHIFT REGISTER | DELAY TIME | TAP COEFFICIENTS ||||||| 
|---|---|---|---|---|---|---|---|---|---|
| | | | 332-0 | 332-1 | 332-2 | 332-3 | 332-4 | 332-5 | 332-6 |
| 0 | 0 | 0 | 1 | 0 | 0 | 0 | 0 | 0 | 0 |
| 1 | 1 | 0.5T | 0.5 | 0.5 | 0 | 0 | 0 | 0 | 0 |
| 2 | 1 | T | 0 | 1 | 0 | 0 | 0 | 0 | 0 |
| 3 | 2 | 1.5T | 0 | 0.5 | 0.5 | 0 | 0 | 0 | 0 |
| 4 | 2 | 2T | 0 | 0 | 1 | 0 | 0 | 0 | 0 |
| 5 | 3 | 2.5T | 0 | 0 | 0.5 | 0.5 | 0 | 0 | 0 |
| 6 | 3 | 3T | 0 | 0 | 0 | 1 | 0 | 0 | 0 |
| 7 | 4 | 3.5T | 0 | 0 | 0 | 0.5 | 0.5 | 0 | 0 |
| 8 | 4 | 4T | 0 | 0 | 0 | 0 | 1 | 0 | 0 |
| 9 | 5 | 4.5T | 0 | 0 | 0 | 0 | 0.5 | 0.5 | 0 |
| 10 | 5 | 5T | 0 | 0 | 0 | 0 | 0 | 1 | 0 |
| 11 | 6 | 5.5T | 0 | 0 | 0 | 0 | 0 | 0.5 | 0.5 |
| 12 | 6 | 6T | 0 | 0 | 0 | 0 | 0 | 0 | 1 |

CROSS-POLARIZATION INTERFERENCE COMPENSATION APPARATUS, CROSS-POLARIZATION INTERFERENCE COMPENSATION METHOD, AND PROGRAM

TECHNICAL FIELD

The present invention relates to a cross-polarization interference compensation apparatus, a cross-polarization interference compensation method, and a program that compensate a signal having a first polarization direction for cross-polarization interference caused by a signal having a second polarization direction crossing the first polarization direction.

BACKGROUND ART

In digital microwave radio communication, a cross-polarization scheme is used. In the cross-polarization scheme, two polarizations that are orthogonal to each other (cross-polarizations), for example, a vertical polarization (V-polarization) and a horizontal polarization (H-polarization), are modulated with different signals to transmit different pieces of information, thereby achieving effective use of a frequency. However, when the cross polarization scheme is employed, if there is propagation disturbance such as rain, anisotropy in a medium occurs, and thus interference may occur in each polarization signal. For this reason, when communication is performed using the cross polarization scheme, it is necessary to perform cross-polarization interference compensation on signals received by receivers (for example, see Patent Document 1). Here, the cross-polarization interference compensation is a process of removing an interference component caused by a polarization signal (interference signal) that crosses a polarization direction of a polarization signal (main signal) to be extracted, from the received signals.

When cross-polarization interference compensation is performed on a polarization signal from one of transmitters (hereinafter referred to as a self-polarization side) among two polarization signals received by receivers, it is necessary to equalize a path length of a path of an interference wave from another transmitter (hereinafter referred to as a different-polarization side) to a demodulator on the self-polarization side with a path length of a path of an interference compensation signal from the transmitter on the different-polarization side to a cross-polarization compensator on the self-polarization side. Thus, radio communication equipment needs to perform the following operation in order to adjust a delay time difference based on the path difference between the polarization signals.

First, in order to know a delay time difference based on a path difference, one of transmitters of an opposing station apparatus outputs a polarization signal, receivers of both polarizations on a reception side receive the polarization signal, and the receives measures the phase difference between output signals of the both receivers. Next, a cable from the receiver on the different-polarization side to a cross-polarization interference compensator is processed based on the measured phase difference, thereby adjusting its length to reduce the delay time difference.

By performing such an operation, a delay time difference based on a path difference between polarization signals is adjusted.

However, this operation has a problem in that the cable processing operation in a station is complex. In order to resolve the complexity of the cable processing operation, Patent Document 2 discloses a technology for adjusting a delay time difference based on the path difference between polarizations without performing the cable processing operation in a station.

In a cross-polarization interference compensation scheme disclosed in Patent Document 2, first, transmitters of both polarizations in an opposing station apparatus outputs the same signal. Next, a signal (interference signal) of the different-polarization side among signals received by receivers of a local station is demodulated using a carrier wave and a clock signal which are synchronized with those of a signal (main signal) of the self-polarization side, and the demodulated signal is converted into an interference compensation signal using a transversal filter. This interference compensation signal is delayed on a bit-by-bit basis by a shift register. At this time, a phase comparator receives the interference compensation signal delayed on a bit-by-bit basis by the shift register and the signal of the self-polarization side, compares their phases with each other, controls the shift register based on the comparison result, and changes the number of stages in the shift register so that the phases become identical. Then, an adder adds the interference compensation signal delayed on a bit-by-bit basis by the shift register to the signal of the self-polarization side, thereby performing cross-polarization interference compensation.

With the cross-polarization interference compensation method disclosed in Patent Document 2, path lengths of both polarizations can be adjusted to be identical, and it is possible to simplify an adjustment operation of radio apparatus equipment in a station.

PRIOR ART DOCUMENTS

Patent Documents

Patent Document 1: Japanese Unexamined Patent Application, First Publication No. H05-260014

Patent Document 2: Japanese Unexamined Patent Application, First Publication No. H09-270764

SUMMARY OF INVENTION

Problems to be Solved by the Invention

However, the cross-polarization interference compensation method disclosed in Patent Document 2 has a problem in that an opposing station apparatus side need to perform transmission output control during an adjustment operation, and thus control becomes complex.

Means for Solving the Problems

The present invention has been made in order to solve the foregoing problems, and a cross-polarization interference compensation apparatus according to the present invention is a cross-polarization interference compensation apparatus which includes: a main signal reception unit which receives a signal having a first polarization direction; an interference signal reception unit which receives a signal having a second polarization direction crossing the first polarization direction; a phase control unit which controls a phase of the signal received by the interference signal reception unit; an interference compensation signal generation unit which generates an interference compensation signal by performing weighted combination on a time series of a signal output by the phase control unit, and setting weighting coefficients used for the weighted combination so that the interference compensation signal becomes a cross-polarization interference component of the signal received by the main signal reception unit; a phase estimation unit which estimates a phase difference between the signal received by the main signal reception unit and the signal received by the interference signal reception unit using information on the weighting coefficients; and a compensation unit which compensates the signal having the first polarization direction for cross-polarization interference caused by the signal having the second polarization direction using the interference compensation signal and the signal received by the main signal reception unit, wherein the phase control unit controls the phase of the signal received by the interference signal reception unit using the phase difference estimated by the phase estimation unit so that a phase of the signal received by the main signal reception unit and the phase of the signal received by the interference signal reception unit become identical.

Also, a cross-polarization interference compensation method according to the present invention is a cross-polarization interference compensation method which includes: receiving a first signal having a first polarization direction; receiving a second signal having a second polarization direction crossing the first polarization direction; controlling a phase of the second signal in accordance with a phase control signal; generating an interference compensation signal by performing weighted combination on a time-series of a signal whose phase has been controlled, and setting weighting coefficients used for the weighted combination so that the interference compensation signal becomes a cross-polarization interference component of the first signal; estimating a phase difference between the first signal and the second signal using information on the weighting coefficients; generating the phase control signal using the estimated phase difference so that a phase of the first signal and the phase of the second signal become identical; and compensating the first signal for cross-polarization interference caused by the second signal using the interference compensation signal and the first signal.

Also, a program according to the present invention is a program for causing a computer of a cross-polarization interference compensation apparatus to function as: a main signal reception unit which receives a signal having a first polarization direction; an interference signal reception unit which receives a signal having a second polarization direction crossing the first polarization direction; a phase control unit which controls a phase of the signal received by the interference signal reception unit; an interference compensation signal generation unit which generate an interference compensation signal by performing weighted combination on a time series of a signal output by the phase control unit, and setting weighting coefficients used for the weighted combination so that the interference compensation signal becomes a cross-polarization interference component of the signal received by the main signal reception unit; a phase estimation unit which estimates a phase difference between the signal received by the main signal reception unit and the signal received by the interference signal reception unit using information on the weighting coefficients; and a compensation unit which compensates the signal having the first polarization direction for cross-polarization interference caused by the signal having the second polarization direction using the interference compensation signal and the signal received by the main signal reception unit, and causing the computer to operate so that the phase control unit controls the phase of the signal output by the interference signal reception unit using the phase difference estimated by the phase estimation unit, and a phase of the signal received by the main signal reception unit and the phase of the signal received by the interference signal reception unit become identical.

Advantageous Effects of the Invention

According to the present invention, a phase estimation unit estimates the phase difference between a main signal and an interference signal using information about weighting coefficients for weighted combination of a time series of interference signals whose phases have been controlled. Using the phase difference estimated by the phase estimation unit, a phase control unit then controls the phase of the interference signal so that the phase of the main signal and the phase of the interference signal become identical. Thereby, a cross-polarization interference compensation apparatus can compensate for cross-polarization interference even when transmitters of both polarizations in an opposing station apparatus output different signals.

BRIEF DESCRIPTION OF DRAWINGS

FIG. 3 is a diagram showing an example of a table stored in a tap coefficient storage read only memory (ROM).

FIG. 7 is a diagram showing another example of a table stored in a tap coefficient storage ROM.

MODES FOR CARRYING OUT THE INVENTION

Hereinafter, exemplary embodiments of the present invention will be described in detail with reference to the drawings.

Figure 1:
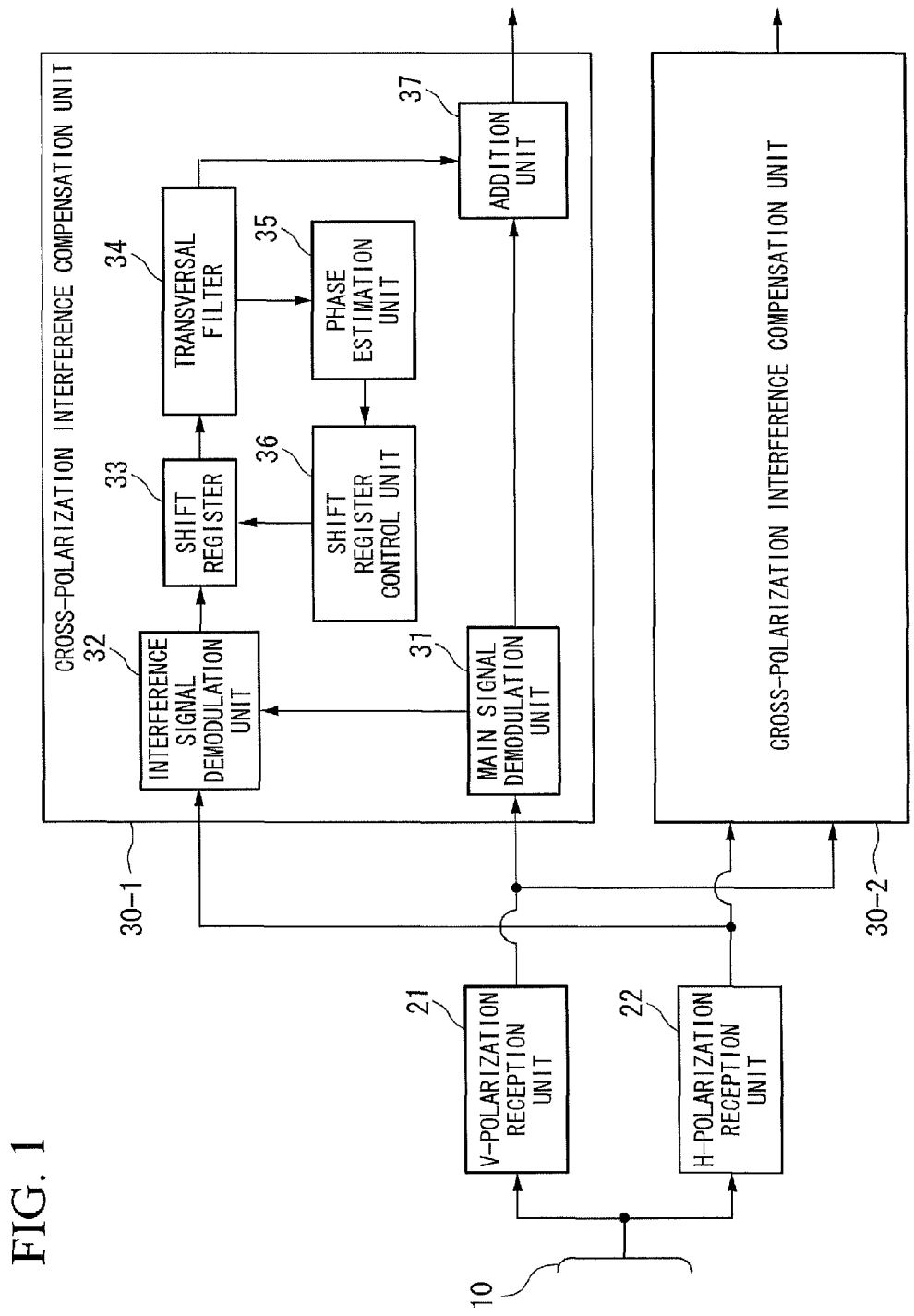
FIG. 1 is a schematic block diagram showing a configuration of a cross-polarization interference compensation apparatus according to an exemplary embodiment of the present invention.

FIG. 1 is a schematic block diagram showing a configuration of a cross-polarization interference compensation apparatus according to an exemplary embodiment of the present invention.

The cross-polarization interference compensation apparatus is provided with an antenna 10, a V-polarization reception unit 21 (a main signal reception unit and an interference signal reception unit), an H-polarization reception unit 22 (a main signal reception unit and an interference signal reception unit), and cross-polarization interference compensation units 30-1 and 30-2 (hereinafter the cross-polarization interference compensation units 30-1 and 30-2 are collectively called cross-polarization interference compensation units 30).

The antenna 10 receives radio frequency (RF) signals of a V-polarization and an H-polarization, which are orthogonal to each other and are transmitted from an opposing station apparatus (not shown).

The V-polarization reception unit 21 converts a V-polarization component of the RF signals received by the antenna 10 into an intermediate frequency signal, and outputs a V-polarization signal while keeping its output at a constant level.

The H-polarization reception unit 22 converts an H-polarization component of the RF frequency signals received by the antenna 10 into an intermediate frequency signal, and outputs an H-polarization signal while keeping its output at a constant level.

The cross-polarization interference compensation unit 30-1 performs cross-polarization interference compensation on the signal output by the V-polarization reception unit 21 using the H-polarization signal.

The cross-polarization interference compensation unit 30-2 performs cross-polarization interference compensation on the signal output by the H-polarization reception unit 22 using the V-polarization signal.

The cross-polarization interference compensation units 30 are provided with a main signal demodulation unit 31 (main signal reception unit), an interference signal demodulation unit 32 (interference signal reception unit), a shift register 33 (phase control unit), a transversal filter 34 (interference compensation signal generation unit), a phase estimation unit 35, a shift register control unit 36 (phase control unit), and an addition unit 37 (compensation unit).

The main signal demodulation unit 31 demodulates a main signal, which is a signal to be extracted among the two polarization signals. Also, the main signal demodulation unit 31 outputs a carrier wave and a clock signal which are synchronized with the main signal, to the interference signal demodulation unit 32. It is to be noted that in the cross-polarization interference compensation unit 30-1, the main signal is the V-polarization signal output by the V-polarization reception unit 21, and in the cross-polarization interference compensation unit 30-2, the main signal is the H-polarization signal output by the H-polarization reception unit 22.

The interference signal demodulation unit 32 receives the carrier wave and the clock signal from the main signal demodulation unit 31, and demodulates an interference signal, which is a signal to be removed among the two polarization signals, using the carrier wave and the clock signal. It is to be noted that in the cross-polarization interference compensation unit 30-1, the interference signal is the H-polarization signal output by the H-polarization reception unit 22, and in the cross-polarization interference compensation unit 30-2, the interference signal is the V-polarization signal output by the V-polarization reception unit 21.

The shift register 33 delays the signal output by the interference signal demodulation unit 32 by a predetermined time slot.

The transversal filter 34 weights and combines a time series of the signals output by the shift register 33, thereby generating an interference compensation signal.

The phase estimation unit 35 receives filter coefficients (weighting coefficients) of the transversal filter 34, estimates phase lag or phase lead between both of the polarization signals (V-polarization signal and H-polarization signal), and outputs the estimation result as phase estimation information.

The shift register control unit 36 outputs a shift register control signal (phase control signal) using the phase estimation information output by the phase estimation unit 35, and thereby controls a delay time of the output signals of the shift register 33 so that the phase of the main signal and the phase of the interference signal become identical.

The addition unit 37 adds the main signal output by the main signal demodulation unit 31 to the interference compensation signal output by the transversal filter 34, thereby removing interference components from the main signal.

Figure 2:
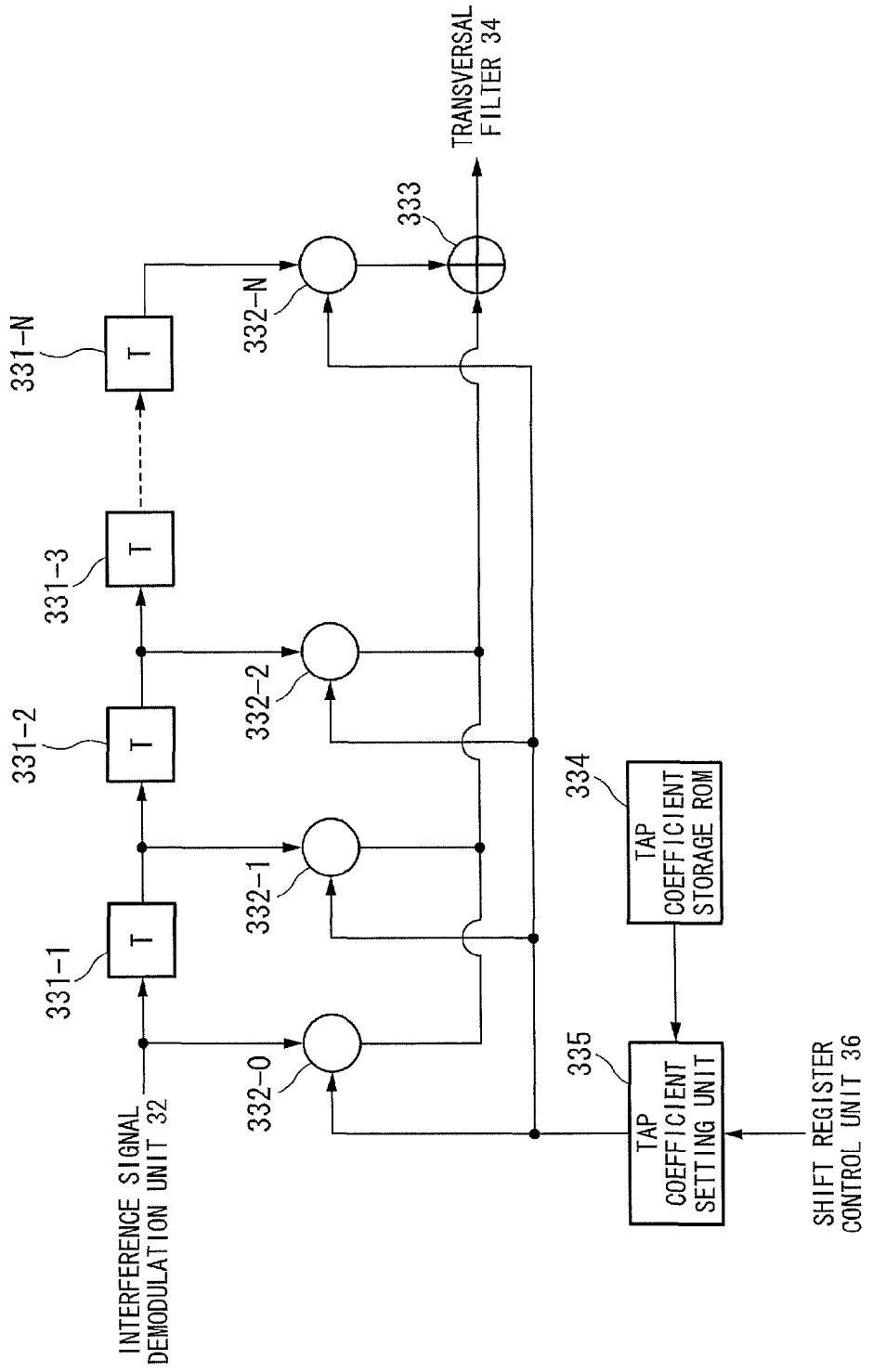
FIG. 2 is a schematic block diagram showing a configuration of a shift register.

FIG. 2 is a schematic block diagram showing a configuration of the shift register 33.

The shift register 33 is an N-stage linear equalizer, and is provided with flip-flops 331-1 to 331-N (delay units for phase control: hereinafter the flip-flops 331-1 to 331-N are collectively called flip-flops 331), taps 332-0 to 332-N (multiplication units for phase control: hereinafter the taps 332-0 to 332-N are collectively called taps 332), an adder 333 (addition unit for phase control), a tap coefficient storage ROM 334 (phase control coefficient deriving unit), and a tap coefficient setting unit 335 (phase control coefficient deriving unit).

The flip-flops 331 are concatenated and each delay an input signal by one clock time and output the delayed signal to the corresponding tap 332 and the flip-flop 331 at the next stage. It is to be noted that the flip-flops 331 operate in accordance with the same clock signal (not shown).

The taps 332 are provided for the flip-flops 331, receive signals from the corresponding flip-flops 331, and perform weighting on the signals using predetermined tap coefficients (phase control coefficients). It is to be noted that the tap 332-0 receives a signal from the interference signal demodulation unit 32, and performs weighting on the signal.

The adder 333 adds the signals output by the taps 332.

The tap coefficient storage ROM 334 stores, as a table, combinations of tap coefficients set for each tap 332 in association with a delay time of an interference signal.

The tap coefficient setting unit 335 receives a shift register control signal indicating a delay time of an output signal of the shift register 33 from the shifter register control unit 36, selects a combination of tap coefficients from the table stored in the tap coefficient storage ROM 334 based on the shift register control signal, and sets the selected tap coefficients in the taps 332. Thereby, the tap coefficient setting unit 335 derives a tap coefficient used by each tap so that the phase of the signal output by the adder 333 and the phase of a cross-polarization interference component of a signal output by the main signal demodulation unit 31 become identical.

FIG. 3 is a diagram showing an example of a table stored in the tap coefficient storage ROM 334.

FIG. 3 shows an example of a table of the tap coefficient storage ROM 334 when the shift register 33 is provided with six flip-flops 331 and seven taps 332 (i.e., when N=6).

The tap coefficient storage ROM 334 stores the number of stages in a shift register, a delay time, and tap coefficients in association with each address.

The number of stages in the shift register denotes the number of stages of delays in the shift register 33.

The delay time denotes a delay time of an interference signal achieved by the associated number of stages of delays. It is to be noted that in FIG. 3, T denotes an operating clock cycle of the shift register 33.

The tap coefficients denote a combination of tap coefficients that are set in the taps 332 for achieving the associated number of stages of delays.

Figure 4:
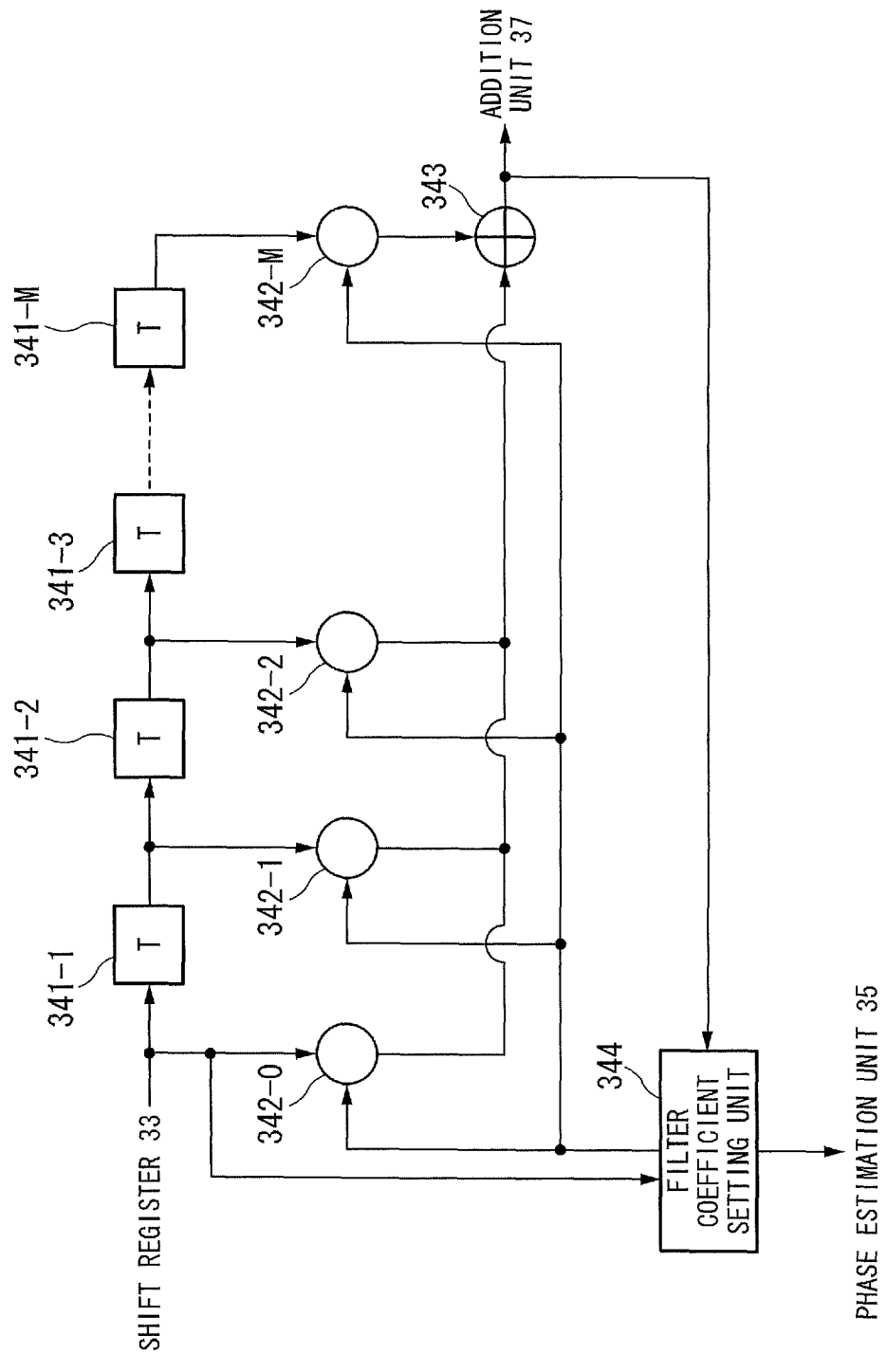
FIG. 4 is a schematic block diagram showing a configuration of a transversal filter.

FIG. 4 is a schematic block diagram showing a configuration of the transversal filter 34.

The transversal filter 34 is an M-stage linear equalizer, and is provided with flip-flops 341-1 to 341-M (delay units: hereinafter the flip-flops 341-1 to 341-M are collectively called flip-flops 341), taps 342-0 to 342-M (multiplication units: the taps 342-0 to 342-M are collectively called taps 342), an adder 343 (addition unit), and a filter coefficient setting unit 344 (filter coefficient deriving unit).

The flip-flops 341 are concatenated and each delay an input signal by one clock time and output the delayed signal to the corresponding tap 342 and the flip-flop 341 at the next stage. It is to be noted that the flip-flops 341 operate in accordance with the same clock signal (not shown).

The taps 342 are provided for the flip-flops 341, receive signals from the corresponding flip-flops 341, and perform weighting on the signals using predetermined filter coefficients. It is to be noted that the tap 342-0 receives a signal from the shift register 33, and performs weighting on the signal.

The adder 343 adds the signals output by the taps 342.

The filter coefficient setting unit 344 sets the filter coefficients used by the taps 342 so that the signal output by the adder 343 becomes a cross-polarization interference component of a signal output by the main signal demodulation unit 31. Also, the filter coefficient setting unit 344 outputs the filter coefficients used by the taps 342 to the phase estimation unit 35. It is to be noted that the filter coefficients may be determined using, for example, a least mean square (LMS) algorithm.

Moreover, with the above-described configuration of the cross-polarization interference compensation apparatus, the V-polarization reception unit 21 receives a V-polarization signal, and the H-polarization reception unit 22 receives an H-polarization signal. Also, the shift register 33 controls the phase of a signal that is output from the H-polarization reception unit 22 and demodulated by the interference signal demodulation unit 32.

The flip-flops 341 of the transversal filter 34 delay a signal output by the shift register 33, the taps 342 multiply signals output by the flip-flops 341 by filter coefficients, and the adder 343 adds signals output by the taps 342. Also, the filter coefficient setting unit 344 derives the filter coefficients used by the taps 342 so that the signal output by the adder 343 becomes a cross-polarization interference component of a signal output by the V-polarization reception unit 21.

Next, the phase estimation unit 35 identifies a tap 342 that uses a filter coefficient having the largest absolute value among the filter coefficients derived by the filter coefficient setting unit 344, and estimates the phase difference between the signal output by the V-polarization reception unit 21 and the signal output by the H-polarization reception unit 22 using information on the tap 342. The shift register control unit 36 then controls the phase of the signal output by the H-polarization reception unit 22 using the phase difference estimated by the phase estimation unit 35 so that the phase of the signal output by the V-polarization reception unit 21 and the phase of the signal output by the H-polarization reception unit 22 become identical.

Thereby, the cross-polarization interference compensation apparatus compensates for cross-polarization interference even when transmitters of both polarizations in the opposing station apparatus output different signals.

Next, an operation of the cross-polarization interference compensation apparatus according to the present exemplary embodiment will be described.

When cross-polarization interference compensation is performed using the cross-polarization interference compensation apparatus shown in FIG. 1, if a delay time of a path taken for a main signal (or an interference wave that interferes with the main signal) from the antenna 10 to arrive at the addition units 37 of the cross-polarization interference compensation units 30 and a delay time of a path taken for an interference signal from the antenna 10 to arrive at the addition units 37 are not identical, it is not possible to perform optimal interference compensation.

Hereinafter, a method for adjusting the delay times of the two paths according to the present exemplary embodiment when a V-polarization signal is the main signal and an H-polarization signal is the interference signal will be described. It is to be noted that even when the main signal is an H-polarization signal and the interference signal is a V-polarization signal, the delay times can be adjusted by performing the same process.

First, when the antenna 10 detects a signal transmitted from an opposing station apparatus, the V-polarization reception unit 21 and the H-polarization reception unit 22 separate polarizations from the signal detected by the antenna 10, and receive a V-polarization signal and an H-polarization signal, respectively. The V-polarization reception unit 21 and the H-polarization reception unit 22 convert the received signals into intermediate frequency signals.

Next, the main signal demodulation unit 31 of the cross-polarization interference compensation unit 30-1 demodulates the V-polarization signal input from the V-polarization reception unit 21 and outputs to the addition unit 37. Also, the main signal demodulation unit 31 generates a clock signal and a carrier wave which are synchronized with the V-polarization signal output to the addition unit 37, and outputs the generated clock signal and carrier wave to the interference signal demodulation unit 32.

Next, the interference signal demodulation unit 32 demodulates the H-polarization signal input from the H-polarization reception unit 22 using the clock signal and the carrier wave input from the main signal demodulation unit 31, and outputs the demodulated signal to the shift register 33.

Next, the shift register 33 delays the H-polarization signal output from the interference signal demodulation unit 32 by a predetermined time slot, and outputs to the transversal filter 34. It is to be noted that the tap coefficient setting unit 335 of the shift register 33 sets an initial value of a delay time to half the maximum delay time of the shift register 33. In the example of FIG. 3, since the number of taps 332 is seven and the maximum delay time of the shift register 33 is "6 T", the tap coefficient setting unit 335 sets the initial value of the delay time of the shift register 33 to "3 T." In other words, in this case, the tap coefficient setting unit 335 sets an initial value of a tap coefficient of the tap 332-3 to "1" and sets initial values of tap coefficients of the other taps 332 to "0."

When the shift register 33 outputs the delayed H-polarization signal, the transversal filter 34 generates an interference compensation signal by multiplying the H-polarization signal input from the shift register 33 by predetermined filter coefficients, and outputs the interference compensation signal to the addition unit 37. It is to be noted that the filter coefficients are derived by the filter coefficient setting unit 344 of the transversal filter 34 using an algorithm such as LMS.

Next, the addition unit 37 adds the signal input from the main signal demodulation unit 31 and the signal input from the transversal filter 34, thereby reproducing a V-polarization signal that has been subjected to cross-polarization interference compensation.

On the other hand, when the filter coefficient setting unit 344 of the transversal filter 34 derives the filter coefficients used by the taps 342, the derived filter coefficients are associated with tap positions (0 to M) indicating positions of the taps 342 that use the filter coefficients and are output to the phase estimation unit 35. The phase estimation unit 35 extracts a tap position associated with a filter coefficient having the largest absolute value among the filter coefficients input from the transversal filter 34.

The phase estimation unit 35 then estimates phase lag or phase lead between the V-polarization signal and the interference compensation signal input to the adder 343 based on the extracted tap position.

Figure 5A:
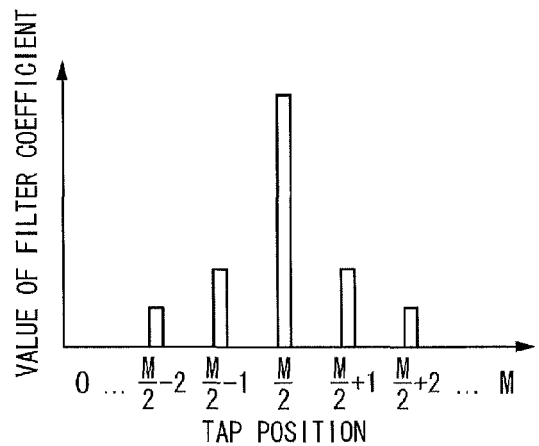
FIG. 5A is a diagram illustrating a relationship between filter coefficients and a magnitude relation of a delay time of a main signal to a delay time of an interference compensation signal when an interference signal and the interference compensation signal have almost the same phase.
Figure 5B:
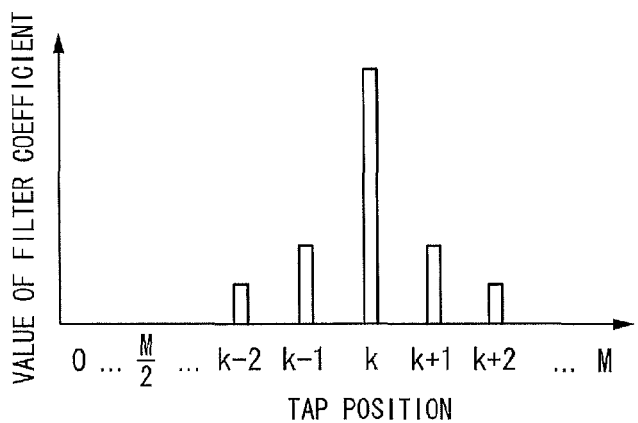
FIG. 5B is a diagram illustrating a relationship between filter coefficients and a magnitude relation of a delay time of a main signal to a delay time of an interference compensation signal when an interference signal is delayed relative to the interference compensation signal.
Figure 5C:
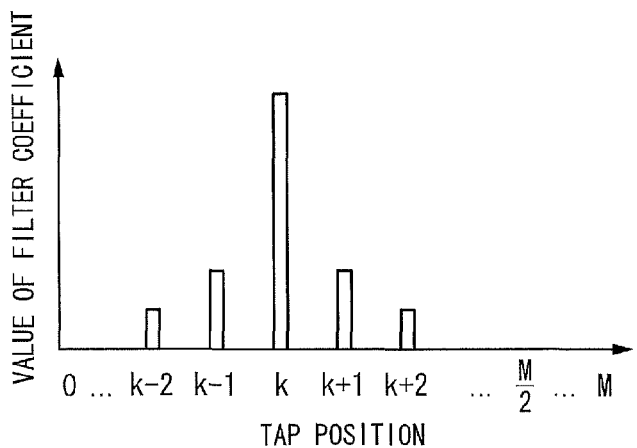
FIG. 5C is a diagram illustrating a relationship between filter coefficients and a magnitude relation of a delay time of a main signal to a delay time of an interference compensation signal when the interference compensation signal is delayed relative to an interference signal.

FIG. 5A to FIG. 5C are diagrams illustrating a relationship between filter coefficients and a magnitude relation of a delay time of a main signal to a delay time of an interference compensation signal. It is to be noted that a horizontal axis denotes tap positions of the transversal filter 34, and a vertical axis denotes the absolute values of filter coefficients.

As shown in FIG. 5A, when a filter coefficient having the largest absolute value is used by a tap 342 at the middle (tap position is M/2) of the transversal filter 34, a delay time of an interference signal that interferes with a main signal and a delay time of an interference compensation signal is almost identical.

Also, as shown in FIG. 5B, it can be seen that, when the filter coefficient having the largest absolute value is used by a tap 342 at a stage ahead of the middle of the transversal filter 34, a path of the interference signal is longer than a path of the interference compensation signal, and the interference signal is delayed relative to the interference compensation signal. In contrast, as shown in FIG. 5C, it can be seen that, when the filter coefficient having the largest absolute value is used by a tap 342 at a stage behind the middle of the transversal filter 34, the path of the interference compensation signal is longer than the path of the interference signal, and the interference compensation signal is delayed relative to the interference signal.

Using such characteristics of the transversal filter 34, the phase estimation unit 35 continuously monitors a tap position of a tap 342 that uses a filter coefficient having the largest absolute value. The phase estimation unit 35 then determines whether the tap 342 is disposed at a front stage or a back stage relative to the middle tap 342. Thereby, the phase estimation unit 35 detects lag (or lead) of the phase of the interference signal relative to the interference compensation signal, and outputs phase estimation information representing the detection result to the shift register control unit 36. It is to be noted that when the filter coefficient having the largest absolute value is used by the middle tap 342 of the transversal filter 34, the phase estimation unit 35 outputs phase estimation information representing that the interference signal and the interference compensation signal have the same phase.

When the phase estimation unit 35 outputs the phase estimation information in accordance with the above-described process, the shift register control unit 36 generates a shift register control signal that controls a delay time of the shift register 33 using the phase estimation information input from the phase estimation unit 35. It is to be noted that the shift register control signal is a signal indicating an address value of the tap coefficient storage ROM 334 (see FIG. 2) of the shift register 33.

Hereinafter a method for generating a shift register control signal in the shift register control unit 36 will be described.

When the phase estimation information input from the phase estimation unit 35 represents that the interference signal has a delayed phase relative to the interference compensation signal, the shift register control unit 36 generates a shift register control signal that increases an address value of the tap coefficient storage ROM 334 in increments of "1" from an initial value "3." Thereby, a delay time of the shift register 33 is increased by "Ts." As a result, a delay time of the H-polarization signal output by the shift register 33 increases, and the phase difference between the interference signal and the interference compensation signal is reduced. Thus, a tap position of a tap 342 that uses a filter coefficient having the largest absolute value in the transversal filter 34 shifts toward the middle tap.

In contrast, when the phase estimation information input from the phase estimation unit 35 represents that the interference signal has a leading phase relative to the interference compensation signal, the shift register control unit 36 generates a shift register control signal that reduces the address value of the tap coefficient storage ROM 334 in increments of "1" from an initial value "3." Thereby, the delay time of the shift register 33 is reduced by "Ts." As a result, the delay time of the H-polarization signal output by the shift register 33 decreases, and the phase difference between the interference signal and the interference compensation signal is reduced. Thus, the tap position of the tap 342 that uses the filter coefficient having the largest absolute value in the transversal filter 34 shifts toward the middle tap.

Also, when the phase estimation information input from the phase estimation unit 35 represents that the interference compensation signal and the interference signal have the same phase, the shift register control unit 36 generates a shift register control signal that maintains the current address value of the tap coefficient storage ROM 334.

When the shift register control signal is input from the shift register control unit 36, the tap coefficient setting unit 335 of the shift register 33 then reads out tap coefficients associated with the corresponding address value from the tap coefficient storage ROM 334 and sets the tap coefficients in the taps 332.

Referring to FIG. 3, when the shift register control signal indicates, for example, an address value "4," the tap coefficient setting unit 335 reads out a combination of tap coefficients associated with the address "4" of the tap coefficient storage ROM 334, that is, a combination of tap coefficients in which only the tap 332-4 indicates "1" and all the others indicate "0," and sets the tap coefficients in the taps 332. Thereby, the delay time of the shift register 33 becomes "4 T."

It is to be noted that as described above, the tap coefficient setting unit 335 sets an initial value of the delay time of the shift register 33 to "3 T," which is half the maximum delay time "6 T" of the shift register 33. Thereafter, the shift register control unit 36 updates the address value of the tap coefficient storage ROM 334 in sequence in accordance with the phase estimation information output from the phase estimation unit 35, thereby controlling the delay time of the shift register.

In this way, in the present exemplary embodiment, the phase estimation unit 35 estimates the phase difference between a main signal and an interference signal based on which tap 342 among the plurality of taps 342 of the transversal filter 34 uses a filter coefficient having the largest absolute value. Also, the shift register control unit 36 controls the phase of the interference signal using the phase difference estimated by the phase estimation unit 35 so that the phase of the main signal and the phase of the interference signal become identical. Thereby, the cross-polarization interference compensation apparatus can compensate for cross-polarization interference even when transmitters of both polarizations in the opposing station apparatus output different signals.

Thus far, an exemplary embodiment of the present invention has been described in detail with reference to the drawings; however, a detailed configuration is not limited to the above-described configuration, and various design modifications and the like can be made within a scope that does not depart from the gist of the present invention.

For example, the present exemplary embodiment has described a case in which the cross-polarization interference compensation apparatus performs cross-polarization interference compensation on a V-polarization signal and an H-polarization signal. However, targets for cross-polarization interference compensation are not limited to these, and the cross-polarization interference compensation apparatus may perform cross-polarization interference compensation on a left-hand circular polarization and a right-hand circular polarization.

Also, the present exemplary embodiment has described a case in which the minimum time span upon setting of a delay time is an operating clock cycle "T" of the shift register 33 and is a fixed value as shown in FIG. 3. However, the set time span is not limited to this.

Figure 6:
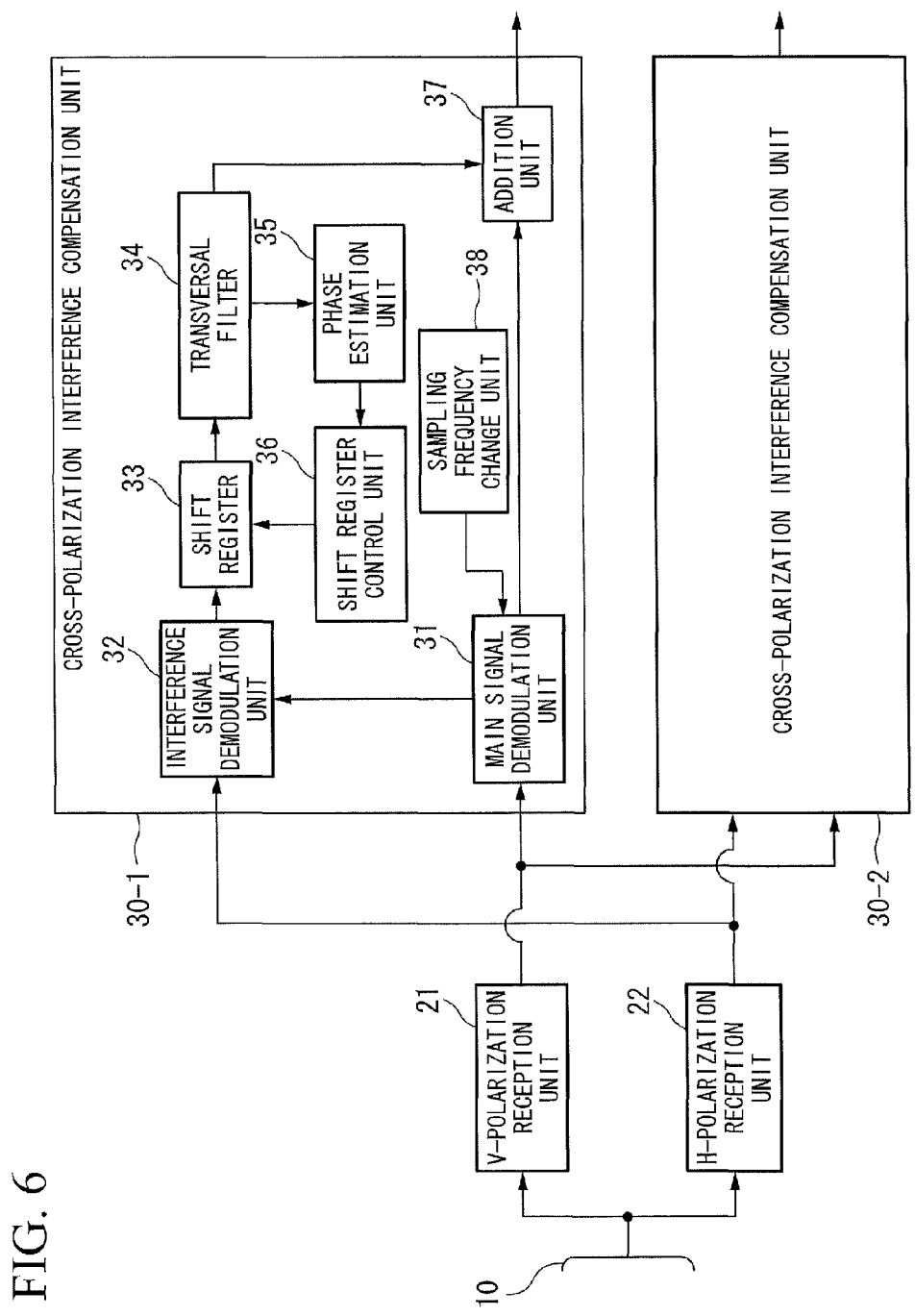
FIG. 6 is a schematic block diagram showing a configuration of a cross-polarization interference compensation apparatus when a sampling frequency change unit is provided.

For example, as shown in FIG. 6, a sampling frequency change unit 38 that increases a sampling frequency of the main signal demodulation unit 31 (and thus, the interference signal demodulation unit 32) may be provided as a means for reducing the set time span. Using the sampling frequency change unit 38, a time interval of sample values of an interference signal input to the shift register 33 is reduced. Thus, it is possible to smoothly perform delay control in the shift register 33.

FIG. 7 is a diagram showing another example of a table stored in the tap coefficient storage ROM 334.

As shown in FIG. 7, the tap coefficient storage ROM 334 of the shift register 33 may store tap coefficients for estimating sampling values, which cannot be extracted using a sampling frequency of the interference signal demodulation unit 32, by linear interpolation.

For example, in the example shown in FIG. 7, a sampling value of a signal output from the interference signal demodulation unit 32 at a time t is denoted as X(t), and tap coefficients are determined so that a sampling value X((k+0.5)T) at a time (k+0.5)T (where k is an integer greater than or equal to 0), at which the interference signal demodulation unit 32 cannot perform sampling, is estimated as (X(kT)/2)+(X((k+1)T)/2). Thereby, the tap coefficient setting unit 335 can shorten a time interval of sample values of an interference signal and a time span upon delay control by the shift register 33 in half.

Moreover, tap coefficients of the shift register 33 may be derived using high-order Lagrange interpolation or the like, instead of using linear interpolation. By doing so, the accuracy of interpolation improves, and thus the number of samples of signal values that can be estimated using interpolation can be increased. Thereby, it is possible to further shorten a time interval of sample values of the interference signal and a time span upon delay control by the shift register 33 while keeping a sampling frequency of a main signal constant.

It is to be noted that when the time span "T" is large (i.e., when a clock frequency is low), if delay control of the shift register is performed under the condition in which cross-polarization interference is extremely strong, there is a possibility that carrier asynchronization will occur. For this reason, by providing a means for reducing a set time span in the cross-polarization interference compensation apparatus, occurrence of carrier asynchronization can be prevented.

The above-described cross-polarization interference compensation apparatus may have a computer system therein. In this case, the above-described operation of the processing units is stored in a computer-readable recording medium in the form of a program, and the computer reads out and executes the program, so that the processing is performed.

Here, the computer-readable recording medium indicates a magnetic disk, a magneto-optical disk, a compact disc (CD)-ROM, a digital versatile disc (DVD)-ROM, a semiconductor memory, or the like. Also, the computer program may be distributed to a computer through a communication line, and the computer may execute the program in response to the distribution.

Also, the program may be intended to implement part of the above-described functions. Furthermore, the program may be a so-called differential file (differential program) capable of implementing the above-described functions in combination with a program that has already been stored in the computer system.

While the present invention has been particularly shown and described with reference to the exemplary embodiments thereof, the present invention is not limited to the exemplary embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-093993 filed on Apr. 15, 2010, the disclosure of which is incorporated herein in its entirety by reference.

INDUSTRIAL APPLICABILITY

The present invention can be used for, for example, compensation of cross-polarization interference that is caused by a signal having a second polarization direction crossing a first polarization direction. In the present invention, cross-polarization interference can be compensated for even when transmitters of both polarizations in an opposing station apparatus output different signals.

DESCRIPTION OF REFERENCE NUMERALS

10 . . . Antenna, 21 . . . V-polarization reception unit, 22 . . . H-polarization reception unit, 30, 30-1, 30-2 . . . Cross-polarization interference compensation unit, 31 . . . Main signal demodulation unit, 32 . . . Interference signal demodulation unit, 33 . . . Shift register, 34 . . . Transversal filter, 35 . . . Phase estimation unit, 36 . . . Shift register control unit, 37 . . . Addition unit, 38 . . . Sampling frequency change unit, 331, 331-1 to 331-N . . . Flip-flop, 332, 332-0 to 332-N . . . Tap, 333 . . . adder, 334 . . . Tap coefficient storage ROM, 335 . . . Tap coefficient setting unit, 341, 341-1 to 341-M . . . Flip-flop, 342, 342-0 to 342-M . . . Tap, 343 . . . adder, 344 . . . Filter coefficient setting unit

The invention claimed is:

1. A cross-polarization interference compensation apparatus comprising:

a main signal reception unit which receives a signal having a first polarization direction;

an interference signal reception unit which receives a signal having a second polarization direction crossing the first polarization direction;

a phase control unit which controls a phase of the signal received by the interference signal reception unit;

an interference compensation signal generation unit which generates an interference compensation signal by performing weighted combination on a time series of a signal output by the phase control unit, and setting weighting coefficients used for the weighted combination so that the interference compensation signal becomes a cross-polarization interference component of the signal received by the main signal reception unit;

a phase estimation unit which estimates a phase difference between the signal received by the main signal reception unit and the signal received by the interference signal reception unit using information on the weighting coefficients; and a compensation unit which compensates the signal having the first polarization direction for cross-polarization interference caused by the signal having the second polarization direction using the interference compensation signal and the signal received by the main signal reception unit, wherein the phase control unit controls the phase of the signal received by the interference signal reception unit using the phase difference estimated by the phase estimation unit so that a phase of the signal received by the main signal reception unit and the phase of the signal received by the interference signal reception unit become identical.

2. The cross-polarization interference compensation apparatus according to claim 1, wherein the weighting coefficients comprise filter coefficients, the interference compensation signal generation unit comprises a filter which includes: a plurality of delay units which are concatenated and delay the signal output by the phase control unit; a plurality of multiplication units which multiply the signal output by the phase control unit and signals output by the delay units by the filter coefficients; an addition unit which adds signals output by the multiplication units; and a filter coefficient deriving unit which derives the filter coefficients, the phase estimation unit identifies a multiplication unit which uses a filter coefficient having a largest absolute value among the filter coefficients derived by the filter coefficient deriving unit, and the information on the weighting coefficients comprises information on the multiplication unit identified by the phase estimation unit.

3. The cross-polarization interference compensation apparatus according to claim 2, wherein the phase control unit includes:

a plurality of phase control delay units which delay the signal received by the interference signal reception unit;

a plurality of phase control multiplication units which multiply the signal received by the interference signal reception unit and signals output by the phase control delay units by phase control coefficients;

a phase control addition unit which adds signals output by the phase control multiplication units; and a phase control coefficient deriving unit which derives the phase control coefficients used by the phase control multiplication units so that a phase of a signal output by the phase control addition unit and a phase of a cross-polarization interference component of the signal received by the main signal reception unit become identical.

4. The cross-polarization interference compensation apparatus according to claim 2, further comprising a sampling frequency change unit which increases a sampling frequency of the signal received by the interference signal reception unit so that a time interval of sample values of the signal input to the phase control unit is reduced.

5. The cross-polarization interference compensation apparatus according to claim 2, wherein the phase control unit performs interpolation of the signal output from the interference signal reception unit to estimate a signal at a time that is not sampled by the interference signal reception unit.

6. The cross-polarization interference compensation apparatus according to claim 5, wherein the interpolation comprises linear interpolation or high-order Lagrange interpolation.

7. The cross-polarization interference compensation apparatus according to claim 2, wherein the phase estimation unit estimates that the more the identified multiplication unit is disposed closer to the phase control unit, the more a signal output by the addition unit is delayed relative to the signal received by the interference signal reception unit, and estimates that the farther the identified multiplication unit is disposed away from the phase control unit, the more the signal received by the interference signal reception unit is delayed relative to the signal output by the addition unit.

8. The cross-polarization interference compensation apparatus according to claim 7, wherein the phase control unit includes:

a plurality of phase control delay units which delay the signal received by the interference signal reception unit;

a plurality of phase control multiplication units which multiply the signal received by the interference signal reception unit and signals output by the phase control delay units by phase control coefficients;

a phase control addition unit which adds signals output by the phase control multiplication units; and a phase control coefficient deriving unit which derives the phase control coefficients used by the phase control multiplication units so that a phase of a signal output by the phase control addition unit and a phase of a cross-polarization interference component of the signal received by the main signal reception unit become identical.

9. The cross-polarization interference compensation apparatus according to claim 7, further comprising a sampling frequency change unit which increases a sampling frequency of the signal received by the interference signal reception unit so that a time interval of sample values of the signal input to the phase control unit is reduced.

10. The cross-polarization interference compensation apparatus according to claim 7, wherein the phase control unit performs interpolation of the signal output from the interference signal reception unit to estimate a signal at a time that is not sampled by the interference signal reception unit.

11. The cross-polarization interference compensation apparatus according to claim 10, wherein the interpolation comprises linear interpolation or high-order Lagrange interpolation.

12. The cross-polarization interference compensation apparatus according to claim 1, wherein the phase control unit includes:

a plurality of phase control delay units which delay the signal received by the interference signal reception unit;

a plurality of phase control multiplication units which multiply the signal received by the interference signal reception unit and signals output by the phase control delay units by phase control coefficients;

a phase control addition unit which adds signals output by the phase control multiplication units; and a phase control coefficient deriving unit which derives the phase control coefficients used by the phase control multiplication units so that a phase of a signal output by the phase control addition unit and a phase of a cross-polarization interference component of the signal received by the main signal reception unit become identical.

13. The cross-polarization interference compensation apparatus according to claim 12, further comprising
a sampling frequency change unit which increases a sampling frequency of the signal received by the interference signal reception unit so that a time interval of sample values of the signal input to the phase control unit is reduced.

14. The cross-polarization interference compensation apparatus according to claim 12,
wherein the phase control unit performs interpolation of the signal output from the interference signal reception unit to estimate a signal at a time that is not sampled by the interference signal reception unit.

15. The cross-polarization interference compensation apparatus according to claim 14, wherein the interpolation comprises linear interpolation or high-order Lagrange interpolation.

16. The cross-polarization interference compensation apparatus according to claim 1, further comprising
a sampling frequency change unit which increases a sampling frequency of the signal received by the interference signal reception unit so that a time interval of sample values of the signal input to the phase control unit is reduced.

17. The cross-polarization interference compensation apparatus according to claim 1,
wherein the phase control unit performs interpolation of the signal output from the interference signal reception unit to estimate a signal at a time that is not sampled by the interference signal reception unit.

18. The cross-polarization interference compensation apparatus according to claim 17, wherein the interpolation comprises linear interpolation or high-order Lagrange interpolation.

19. A cross-polarization interference compensation method comprising:
receiving a first signal having a first polarization direction;
receiving a second signal having a second polarization direction crossing the first polarization direction;
controlling a phase of the second signal in accordance with a phase control signal;
generating an interference compensation signal by performing weighted combination on a time-series of a signal whose phase has been controlled, and setting weighting coefficients used for the weighted combination so that the interference compensation signal becomes a cross-polarization interference component of the first signal;
estimating a phase difference between the first signal and the second signal using information on the weighting coefficients;
generating the phase control signal using the estimated phase difference so that a phase of the first signal and the phase of the second signal become identical; and
compensating the first signal for cross-polarization interference caused by the second signal using the interference compensation signal and the first signal.

20. A non-transitory computer-readable medium for causing a computer of a cross-polarization interference compensation apparatus to function as:
a main signal reception unit which receives a signal having a first polarization direction;
an interference signal reception unit which receives a signal having a second polarization direction crossing the first polarization direction;
a phase control unit which controls a phase of the signal received by the interference signal reception unit;
an interference compensation signal generation unit which generate an interference compensation signal by performing weighted combination on a time series of a signal output by the phase control unit, and setting weighting coefficients used for the weighted combination so that the interference compensation signal becomes a cross-polarization interference component of the signal received by the main signal reception unit;
a phase estimation unit which estimates a phase difference between the signal received by the main signal reception unit and the signal received by the interference signal reception unit using information on the weighting coefficients; and
a compensation unit which compensates the signal having the first polarization direction for cross-polarization interference caused by the signal having the second polarization direction using the interference compensation signal and the signal received by the main signal reception unit, and
causing the computer to operate so that the phase control unit controls the phase of the signal output by the interference signal reception unit using the phase difference estimated by the phase estimation unit, and a phase of the signal received by the main signal reception unit and the phase of the signal received by the interference signal reception unit become identical.

* * * * *